(12) United States Patent
Malladi et al.

(10) Patent No.: US 9,160,484 B2
(45) Date of Patent: Oct. 13, 2015

(54) METHODS AND SYSTEMS FOR PDCCH BLIND DECODING IN MOBILE COMMUNICATIONS

(71) Applicant: QUALCOMM Incorporated, San Diego, CA (US)

(72) Inventors: Durga Prasad Malladi, San Diego, CA (US); Juan Montojo, Nuremberg (DE); Sandip Sarkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/166,037

(22) Filed: Jan. 28, 2014

(65) Prior Publication Data

US 2014/0140306 A1    May 22, 2014

Related U.S. Application Data

(63) Continuation of application No. 13/529,900, filed on Jun. 21, 2012, now Pat. No. 8,681,906, which is a continuation of application No. 12/259,798, filed on Oct. 28, 2008, now Pat. No. 8,238,475.

(60) Provisional application No. 60/983,907, filed on Oct. 30, 2007.

(51) Int. Cl.
| | |
|---|---|
| *H04L 27/06* | (2006.01) |
| *H04L 1/00* | (2006.01) |
| *H04W 72/04* | (2009.01) |

(52) U.S. Cl.
CPC ........... *H04L 1/0038* (2013.01); *H04W 72/042* (2013.01)
USPC ........................................................ 375/340

(58) Field of Classification Search
USPC ................. 375/316, 340–341; 370/335–342
See application file for complete search history.

(56) References Cited

U.S. PATENT DOCUMENTS

| | | | |
|---|---|---|---|
| 7,072,926 | B2 | 7/2006 | Nagata et al. |
| 7,924,755 | B2 | 4/2011 | Xu et al. |

(Continued)

FOREIGN PATENT DOCUMENTS

| | | |
|---|---|---|
| CN | 1901430 A | 1/2007 |
| EP | 1990926 A1 | 11/2008 |

(Continued)

OTHER PUBLICATIONS

3rd Generation Partnership Project: "Tree Structure for the DL Control Channel" 3GPP TSG-RAN WG1 Meeting #48BIS, R1-071683, Mar. 26, 2007, XP002525282 St. Julians, Malta the whole document.

(Continued)

*Primary Examiner* — Khanh C Tran
(74) *Attorney, Agent, or Firm* — Ashish L. Patel

(57) ABSTRACT

Various methods and systems for efficiently performing the blind decoding of downlink signals is described. Several forms of arranging possible CCE combinations are examined and investigated. Based on PDCCH size estimation/information, CCE concatenations that are most likely (of of limited sets) can be arrived at. Tree-based concatenations are also devised using largest CCE ordering to align smaller CCE sizes to similar boundaries. By such ordering, the search space for all possible CCE ordering and sizes can be reduced to an efficient tree. Set mapping between possible lnposelstartCCElnposelend/REs are also described using a first set to secondary and tertiary sets. Various other ordering and sorting schemes are also detailed that enable a blind decode of a PDCCH channel to be efficiently performed.

6 Claims, 10 Drawing Sheets

(56) References Cited

U.S. PATENT DOCUMENTS

| | | | |
|---|---|---|---|
| 7,995,661 B2 | 8/2011 | Xu et al. | |
| 8,155,683 B2 * | 4/2012 | Buckley et al. | 455/515 |
| 8,238,475 B2 | 8/2012 | Malladi et al. | |
| 8,326,292 B2 * | 12/2012 | Lin | 455/434 |
| 2004/0066766 A1 | 4/2004 | Shiu et al. | |
| 2005/0136937 A1 | 6/2005 | Qian et al. | |
| 2010/0260124 A1 | 10/2010 | Noshio et al. | |
| 2012/0263134 A1 | 10/2012 | Malladi et al. | |
| 2013/0010724 A1 * | 1/2013 | Han et al. | 370/329 |

FOREIGN PATENT DOCUMENTS

| | | |
|---|---|---|
| GB | 2428545 | 1/2007 |
| JP | 2010525700 A | 7/2010 |
| JP | 2010541367 A | 12/2010 |
| RU | 2239950 | 11/2004 |
| RU | 2247471 C2 | 2/2005 |
| WO | 0013363 A1 | 3/2000 |
| WO | 0126257 A1 | 4/2001 |
| WO | 2006106377 A1 | 10/2006 |
| WO | 2009040653 A2 | 4/2009 |
| WO | 2009041779 A1 | 4/2009 |
| WO | 2009057283 A1 | 5/2009 |

OTHER PUBLICATIONS

3rd Generation Partnership Project: "Structure and transport of the Downlink Control Channels" 3GPP TSG RAN WG1 #48 Meeting, R1-071003, Jun. 12, 2007, XP002525283, St. Louis, USA figures 2,5-7 sections 1, 2, 6-8.

International Search Report & Written Opinion—PCT/US2008/081641, International Search Authority—European Patent Office—Oct. 8, 2009.

Motorola: "3GPP TSG RAN1#50 R1-073373 Search Space Definition for L1/L2 Control Channels" 3GPP TSG RAN #50,[Online] vol. R1-073373, No. 50, Aug. 20, 2007, pp. 1-11, XP002512720 Retrieved from the Internet: URL:http://www.3gpp.org/ftp/tsgran/WG1_RL1/TSGR1_50/Docs/R1-073373.zip> [retrieved on Jan. 29, 2009] the whole document.

Motorola: "Search Space Definition: Reduced PDCCH Blind Detection for Split PDCCH Search Space" 3GPP Draft; R1-073996—Split Search Space for Reduced PDCCH Blind Detection, 3rd Generation Partnership Project (3GPP), Mobile Competence Centre ; 650, Route Des Lucioles ; F-06921 Sophia-Antipolis Cedex ; France, vol . RAN WG1, no. Shanghai, China; 20071003, Oct. 3, 2007, XP050107552 [retrieved on Oct. 3, 2007] figure 1 sections 1-3.

Motorola: "Efficient structure for aggregating 1,2,[3],4,8 DL control channel elements", 3GPP TSG-RAN WGl Meeting #49, R1-072607, Kobe, Japan, May 7, 2007, pp. 1-5, XP002518868 figures 5-7 sections 3 and 4.

Motorola: "E-UTRA DL L1/L2 Control Channel Design" 3GPP Draft; R1-070787 DL L1L2CCH Design , 3rd Generation Partnership Project (3GPP), Mobile Competence Centre ; 650, Route Des Lucioles ; F-06921 Sophia-Antipolis Cedex ; France, vol. RAN WGI, no. St. Louis, USA; 20070206, Feb. 6, 2007, XP050104814 [retrieved on Feb. 6, 2007] figure 3 section 5 Annex A.

Samsung: "Configuration of PDCCH Monitoring Set,"3GPP TSG-RAN WG1 Meeting #50b, R1-074078, Oct. 8, 2007.

Taiwan Search Report—TW097141872—TIPO—Feb. 1, 2013.

Texas Instruments: "Choice of CRC Length to Reduce False PDCCH Detection," 3GPP TSG-RAN WG1 Meeting #50, R1-073421, Aug. 20, 2007.

* cited by examiner ns" filed Jun. 21, 2012, now allowed, which is a con-
METHODS AND SYSTEMS FOR PDCCH BLIND DECODING IN MOBILE COMMUNICATIONS

CLAIM OF PRIORITY

The present Application for Patent is a continuation of U.S. patent application Ser. No. 13/529,900, entitled "Methods and Systems for PDCCH Blind Decoding in Mobile Communications" filed Jun. 21, 2012, now allowed, which is a continuation of U.S. patent application Ser. No. 12/259,798, entitled "Methods and Systems for PDCCH Blind Decoding in Mobile Communications" filed Oct. 28, 2008, now granted, U.S. Pat. No. 8,238,475, issued on Aug. 7, 2012, which claims priority to Provisional Patent Application No. 60/983,907, entitled "BDCCH Blind Decoding Methods and Systems," filed Oct. 30, 2007, both assigned to the assignee hereof and both hereby expressly incorporated by reference herein.

FIELD

This disclosure relates generally to wireless communications, and more particularly to blind decoding of the Physical Downlink Control Channel (PDCCH) for user equipment.

BACKGROUND

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic Channel
D-BCH Dynamic Broadcast CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic Channel
P-BCH Primary Broadcast CHannel
PCCH Paging Control Channel
PCFICH Physical Control Format Indicator CHannel
PCH Paging Channel
PDCCH Physical Downlink Control CHannel
PDU Protocol Data Unit
PHY PHYsical layer
PHICH Physical Hybrid-ARQ Indicator CHannel
PhyCH Physical CHannels
RACH Random Access Channel
RE Resource Element
RS Reference Signal
RLC Radio Link Control
RoHC Robust Header Compression
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network Universal Mobile Telecommunications System (UMTS) is one of the third-generation (3G) wireless phone technologies. Currently, the most common form of UMTS uses W-CDMA as the underlying air interface. UMTS is standardized by the 3rd Generation Partnership Project (3GPP), and is sometimes marketed as 3GSM as a way of emphasizing the combination of the 3G nature of the technology and the GSM standard which it was designed to succeed.

UTRAN (UMTS Terrestrial Radio Access Network) is a collective term for the Node-B's and Radio Network Controllers which make up the UMTS radio access network. The UTRAN allows connectivity between the UE and a core network, and can include UEs, Node Bs, and Radio Network Controllers (RNCs)—noting that an RNC and Node B can be the same device, although typical implementations have a separate RNC located in a central office serving multiple Node B's.

For UMTS, a Broadcast Channel (BCH) may have a fixed pre-defined transport format and may be broadcasted over the entire coverage area of a cell. In Long Term Evolutino (LTE) which improves upon the UMTS standard, the broadcast channel may be used to transmit a "System Information field" necessary for system access. However, due to the large size of a System Information field, the BCH may be divided into two portions including a Primary Broadcast CHannel (P-BCH) and Dynamic Broadcast CHannel (D-BCH). The P-BCH may contain basic Layer 1 (physical layer)/Layer 2 (data link layer) (or "L1/L2") system parameters useful to demodulate the D-BCH, which in turn may contain the remaining System Information field.

It may occur that a UE may need to blindly decode a Physical Downlink Control Channel (PDCCH) from from several possible formats and associated Control Channel Elements (CCEs). Unfortunately, this may impose a substantial burden on the UE that may exceed practical hardware limitations and thus lead to increased costs and/or reduced performance of the UE.

Therefore, there is a need for addressing this issue. Accordingly, methods and systems for addressing this and other issues are disclosed herein.

SUMMARY

The foregoing needs are met, to a great extent, by the present disclosure.

In one of various aspects of the disclosure, a method to reduce the processing overhead for blind decoding a PDCCH signal is provided, comprising: estimating a suitable sized CCE segment in a PDCCH signal; generating a tree structure containing contiguous CCE aggregation levels of the estimated CCE segment, wherein the CCE aggregations are multiples of the estimated CCE segment; arranging the aggregation levels in a hierarchal order, wherein each level's initial position is coincident with all other levels' initial positions; and decoding the PDCCH signal by using boundaries defined by the tree structure, wherein the boundaries form a search path, enabling a reduced search for a blind decode.

In one of various other aspects of the disclosure, a computer-readable product is provided, containing code for: estimating a suitable sized CCE segment in a PDCCH signal; generating a tree structure containing contiguous CCE aggregation levels of the estimated CCE segment, wherein the CCE aggregations are multiples of the estimated CCE segment; arranging the aggregation levels in a hierarchal order, wherein each level's initial position is coincident with all other levels' initial positions; and decoding the PDCCH signal by using boundaries defined by the tree structure, wherein the boundaries form a search path, enabling a reduced search for a blind decode.

In one of various aspects of the disclosure, an apparatus configured to reduce the processing overhead for PDCCH blind decoding is provided, comprising: circuitry configured to blind decode a PDCCH signal, the circuitry capable of estimating a suitable sized CCE segment in a PDCCH signal; capable of generating a tree structure containing contiguous CCE aggregation levels of the estimated CCE segment, wherein the CCE aggregations are multiples of the estimated CCE segment; capable of arranging the aggregation levels in a hierarchal order, wherein each level's initial position is coincident with all other levels' initial positions; and capable of decoding the PDCCH signal by using boundaries defined by the tree structure, wherein the boundaries form a search path, enabling a reduced search for a blind decode.

In one of various aspects of the disclosure, an apparatus to reduce processing overhead for PDCCH blind decoding is provided, comprising: means for estimating a suitable sized CCE segment in a PDCCH signal; means for generating a structure containing contiguous CCE aggregation levels of the estimated CCE segment, wherein the CCE aggregations are multiples of the estimated CCE segment; means for arranging the aggregation levels in a hierarchal order, wherein each level's initial position is coincident with all other levels' initial positions; and means for decoding the PDCCH signal by using boundaries defined by the structure, wherein the boundaries form a search path, enabling a reduced search for a blind decode.

In one of various aspects of the disclosure, a method to reduce the processing overhead for PDCCH blind decoding using an initial estimate of largest-to-smallest CCEs is provided comprising: estimating a suitable largest sized CCE segment in the PDCCH signal; sorting all combinations of CCEs possible in the PDCCH into sets having a largest CCE in the beginning of its set, and smaller CCEs in the set are ordered in a largest-to-smallest order; ordering all the sorted sets into at a greatest number of elements to smallest number of elements order, or vice versus; and performing a reduced search space blind search using elements from the ordered sets, starting with the set having the smallest number of elements.

In one of various aspects of the disclosure, a computer-readable product is provided, containing instructions to reduce the processing overhead for PDCCH blind decoding using an initial estimate of largest-to-smallest CCEs, the instructions comprising: sorting all combinations of CCEs possible in the PDCCH into sets having a largest CCE in the beginning of its set, and smaller CCEs in the set are ordered in a largest-to-smallest order; ordering all the sorted sets into at a greatest number of elements to smallest number of elements order, or vice versus; and performing a reduced search space blind search using elements from the ordered sets, starting with the set having the smallest number of elements.

In one of various aspects of the disclosure, an apparatus configured to reduce the processing overhead for PDCCH blind decoding using an initial estimate of largest-to-smallest CCEs is provided, comprising: circuitry configured to blind decode a PDCCH signal, wherein an initial estimate of the number of information bits of the PDCCH signal is based on sorting all combinations of CCEs possible in the PDCCH into sets having a largest CCE in the beginning of its set, and smaller CCEs in the set are ordered in a largest-to-smallest order, the circuitry capable of ordering all the sorted sets into at least one of a greatest number of elements to smallest number of elements order, or vice versus, and the circuitry capable of performing a reduced search space blind search using elements from the ordered sets, starting with the set having the smallest number of elements.

In one of various aspects of the disclosure, an apparatus configured to reduce the processing overhead for PDCCH blind decoding using an initial estimate of largest-to-smallest CCEs, comprising: means for sorting all combinations of CCEs possible in the PDCCH into sets having a largest CCE in the beginning of its set, and smaller CCEs in the set are ordered in a largest-to-smallest order; means for ordering all the sorted sets into at a greatest number of elements to smallest number of elements order, or vice versus; and means for performing a reduced search space blind search using elements from the ordered sets, starting with the set having the smallest number of elements.

In one of various aspects of the disclosure, a method to reduce the processing overhead for PDCCH blind decoding is provided, comprising: receiving a PDCCH signal; estimating a maximum number of information bits used in the PDCCH signal; restraining a candidate number of information bits to a first set of information bits; mapping a first subset of the first set to a second set that is not in the first set; mapping a second subset of the first set to a third set that is not in the first set; restraining concatenation of elements of the sets to form largest to smallest order; and performing a blind decoding initially based on elements in the first set, and proceeding to elements of the second set and third set.

In one of various aspects of the disclosure, a computer-readable product is provided containing code for: receiving a PDCCH signal; estimating a maximum number of information bits used in the PDCCH signal; restraining a candidate number of information bits to a first set of information bits; mapping a first subset of the first set to a second set that is not in the first set; applying a second subset of the first set to a third set that is not in the first set; restraining concatenation of elements of the sets to form largest to smallest order; and performing a blind decoding initially based on elements in the first set, and proceeding to elements of the second set and third set.

In one of various aspects of the disclosure, an apparatus configured to reduce the processing overhead for PDCCH blind decoding is provided, comprising: means for receiving a PDCCH signal; means for estimating a maximum number of information bits used in the PDCCH signal; means for restraining a candidate number of information bits to a first set of information bits; means for mapping a first subset of the first set to a second set that is not in the first set; means for mapping a second subset of the first set to a third set that is not in the first set; means for restraining concatenation of elements of the sets to form largest to smallest order; and means for performing a blind decoding initially based on elements in the first set, and proceeding to elements of the second set and third set.

DETAILED DESCRIPTION

Figure 1:
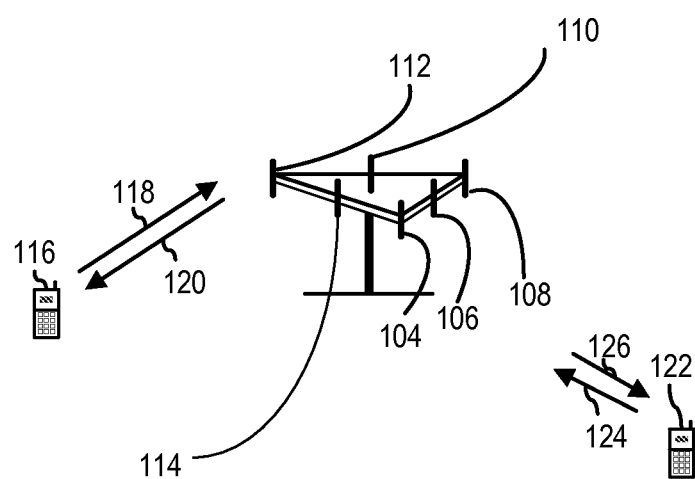
FIG. 1 is an illustration of a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to or utilizing a wireless modem. Moreover, various embodiments are described herein in connection with a base station. A base station can be utilized for communicating with access terminal(s) and can also be referred to as an access point, Node B, eNode B (eNB), or some other terminology. Depending on the context of the descriptions provided below, the term Node B may be replaced with eNB and/or vice versus as according to the relevant communcation system being employed.

An orthogonal frequency division multiplex (OFDM) communication system effectively partitions the overall system bandwidth into multiple ($N_F$) subcarriers, which may also be referred to as frequency subchannels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. OFDM may be used to combat inter-symbol interference (ISI) caused by frequency selective fading, which is characterized by different amounts of attenuation across the system bandwidth.

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subcarrier of the MIMO channel and corresponds to a dimension. The MIMO system can provide improved performance (e.g., increased transmission capacity) if the additional dimensionalities created by the multiple transmit and receive antennas are utilized.

For a MIMO system that employs OFDM (i.e., a MIMO-OFDM system), $N_F$ frequency subcarriers are available on each of the $N_S$ spatial subchannels for data transmission. Each frequency subcarrier of each spatial subchannel may be referred to as a transmission channel. There are $N_F \cdot N_S$ transmission channels thus available for data transmission between the $N_T$ transmit antennas and $N_R$ receive antennas.

For a MIMO-OFDM system, the $N_F$ frequency subchannels of each spatial subchannel may experience different channel conditions (e.g., different fading and multipath effects) and may achieve different signal-to-noise-and-interference ratios (SNRs). Each transmitted modulation symbol is affected by the response of the transmission channel via which the symbol was transmitted. Depending on the multi-path profile of the communication channel between the transmitter and receiver, the frequency response may vary widely throughout the system bandwidth for each spatial subchannel, and may further vary widely among the spatial subchannels.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
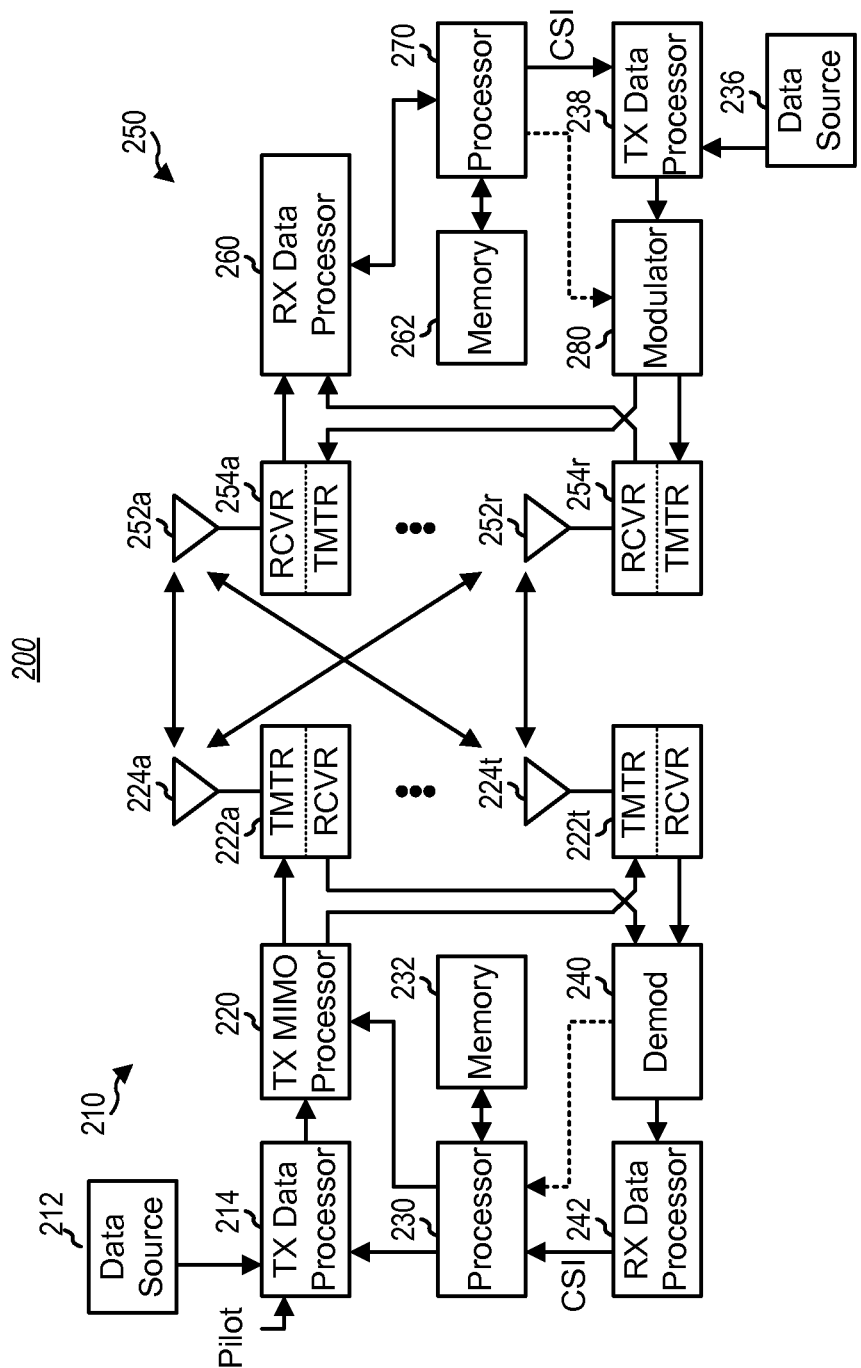
FIG. 2 is a block diagram of an embodiment of a transmitter system and receiver system in a MIMO configuration.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to ransmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may provide supporting memory services to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion. Memory 262 may provide supporting memory services to processor 270.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

Figure 3:
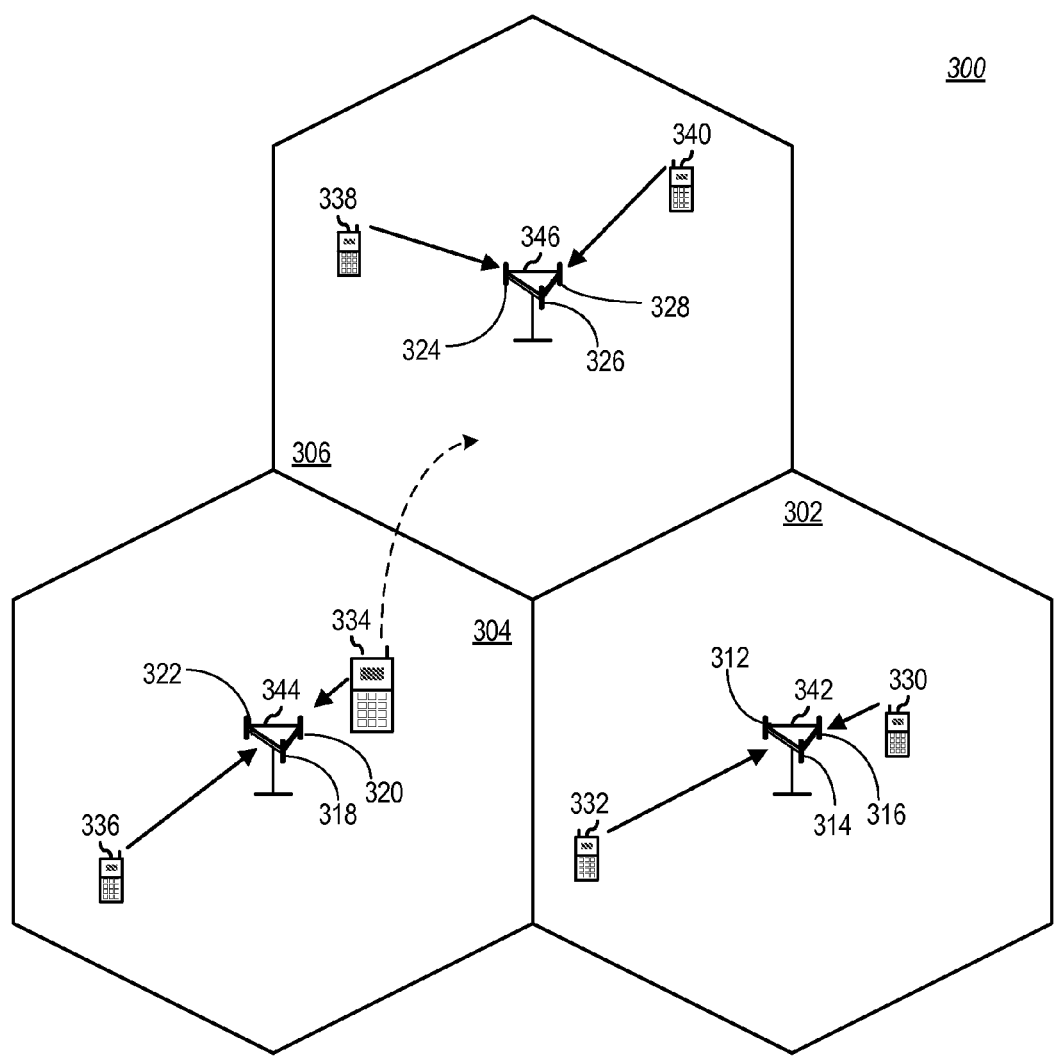
FIG. 3 is an illustration of a multiple access wireless communication system.

Referring to FIG. 3, a multiple access wireless communication system 300 according to one aspect is illustrated. The multiple access wireless communication system 300 includes multiple regions, including cells 302, 304, and 306. In the aspect of FIG. 3, each cell 302, 304, and 306 may include a Node B that includes multiple sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector.

Each cell 302, 304 and 306 can include several wireless communication devices, e.g., User Equipment or UEs, which can be in communication with one or more sectors of each cell 302, 304 or 306. For example, UEs 330 and 332 can be in communication with Node B 342, UEs 334 and 336 can be in communication with Node B 344, and UEs 338 and 340 can be in communication with Node B 346.

Information and/or data is conveyed via channels. These channels may be represented by physical hardware, frequencies, time bands, logical connections or abstract representations, and so forth, depending on the context and use thereof. In the UMTS framework, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH), which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In one aspect, Logical Traffic Channels can comprise a Dedicated Traffic Channel (DTCH), which is a point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For UMTS, a Broadcast Channel (BCH) may have a fixed pre-defined transport format and may be broadcasted over the entire coverage area of a cell. In LTE, the broadcast channel may be used to transmit a "System Information field" necessary for system access. However, due to the large size of the System Information field, the BCH may be divided into multiple portions including a Primary Broadcast CHannel (P-BCH) and Dynamic Broadcast CHannel (D-BCH). The P-BCH may contain basic Layer 1 (physical layer)/Layer 2 (data link layer) (or "L1/L2") system parameters useful to demodulate the D-BCH, which in turn may contain the remaining System Information field.

Figure 4A:
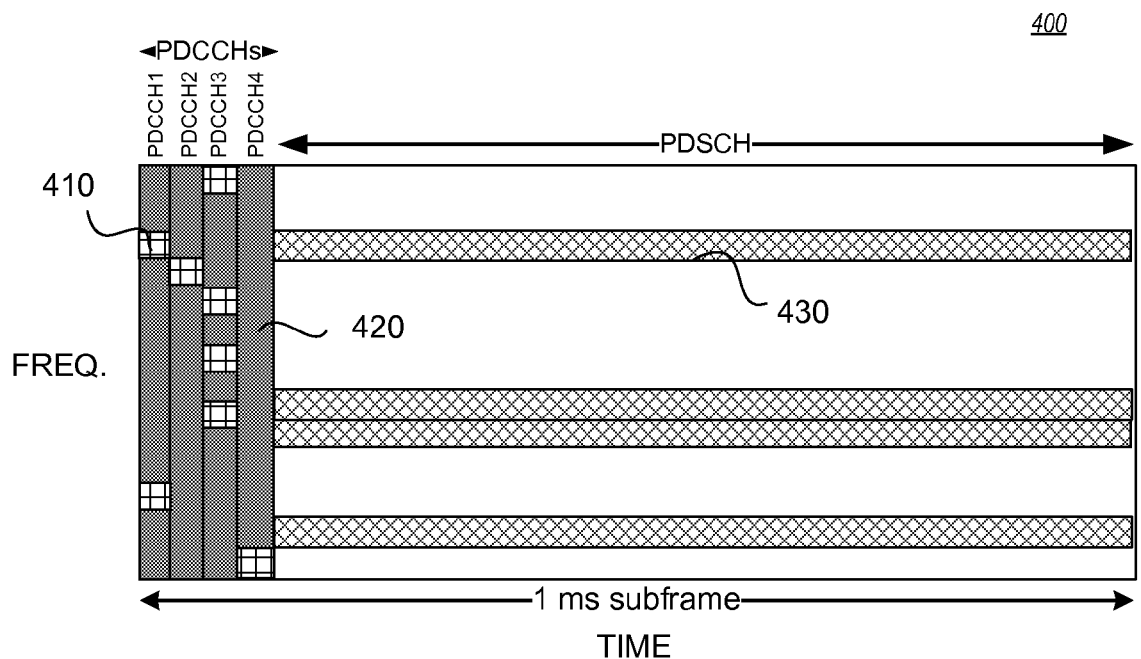
FIG. 4A-B are diagrams illustrating a PDCCH in a 1 ms subframe and CCE hierarchy, respectively.

An example of the multiple portioning of the BCH for a downlink paging scenario is provided in FIG. 4A, where a PDCCH and PDSCH is shown in a 1 ms subframe. FIG. 4A is instructive in illustrating that the fore of the subframe contains resource elements (REs) 410 arranged in the time strips 420. It is understood in the OFDM environment that the PDCCH structure is based on CCEs which are built from REs 410. Depending on the system, there are 36 REs per CCE with each RE 410 based on a tone or modulation symbol. And each tone or modulation symbol corresponding to a pair of bits. That is, each CCE consists of 36 REs which in turn consist of 2 bits or 2 coded values. Therefore, for each individual CCE there is an equivalent of 72 coded bits/values. The PDCCH may accommodate multiple CCEs at different times, when the channel characteristics become degraded in order to provide better information integrity.

Figure 4B:
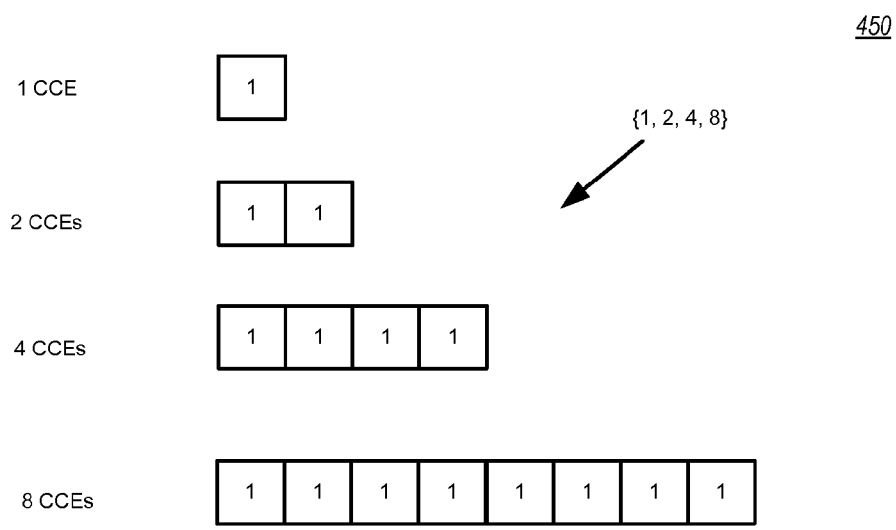
Figure 5:
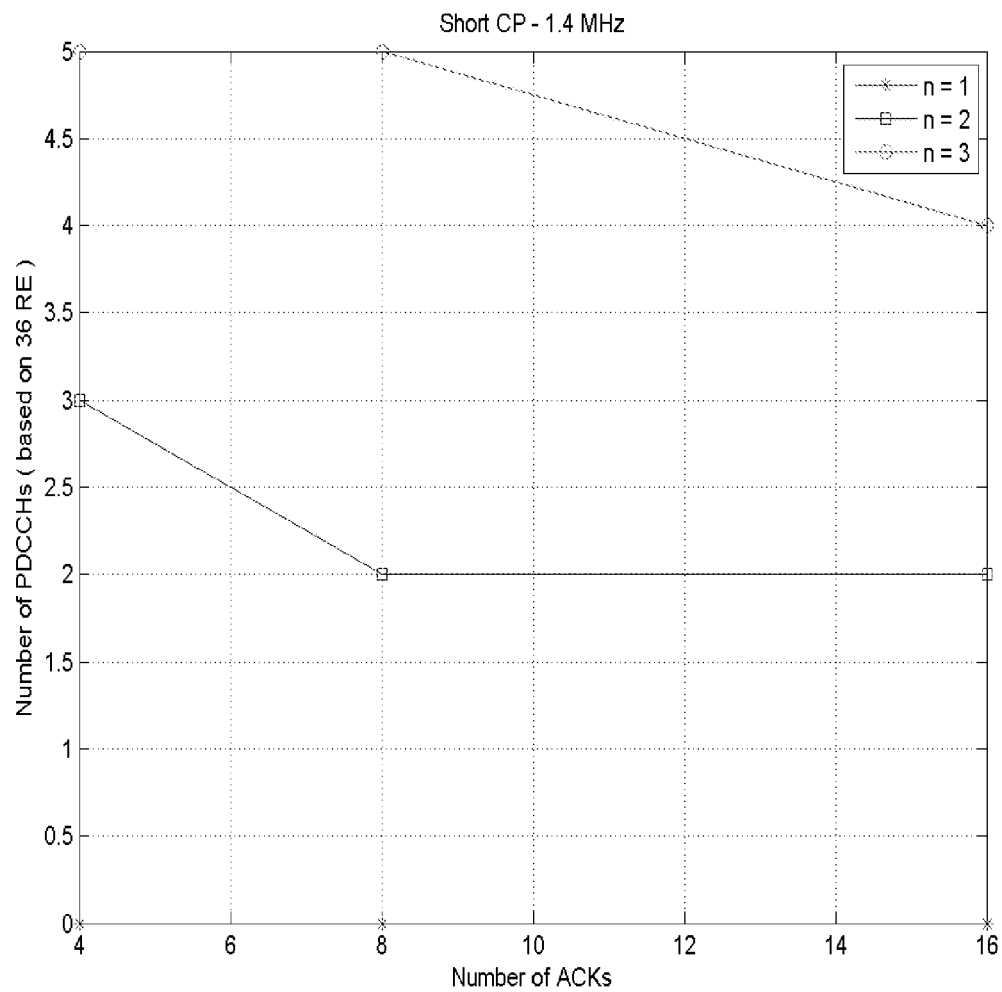
FIGS. 5-8 depict graphical representations of the number of PDCCHs as a function of different bandwidths, the span of the PDCCH, and a short CP.
Figure 6:
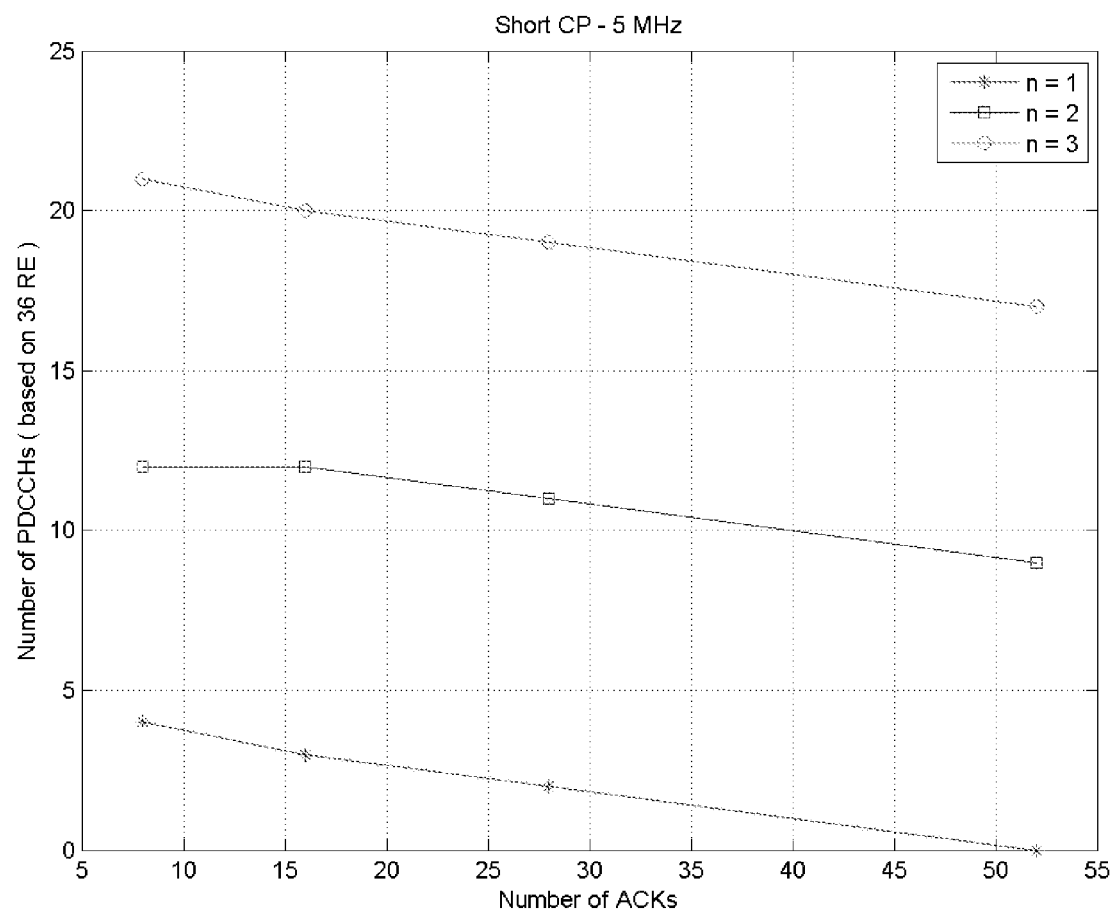
Figure 7:
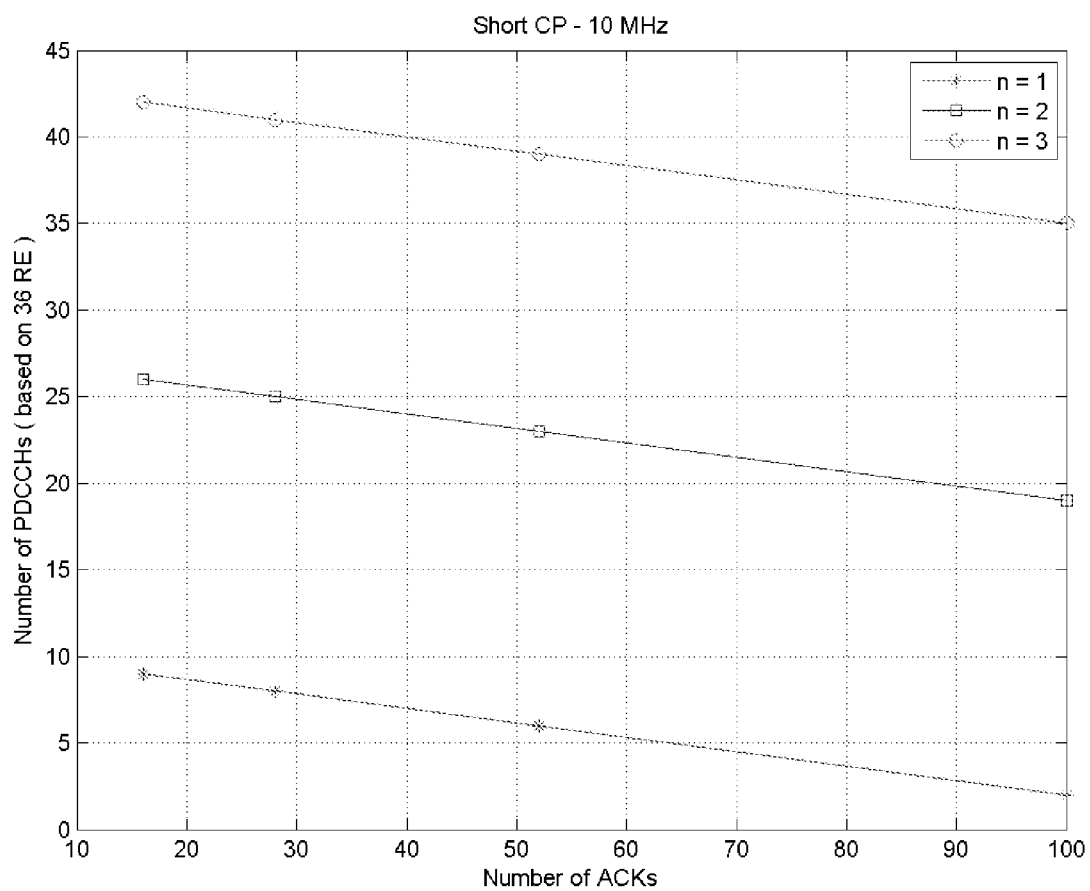
Figure 8:
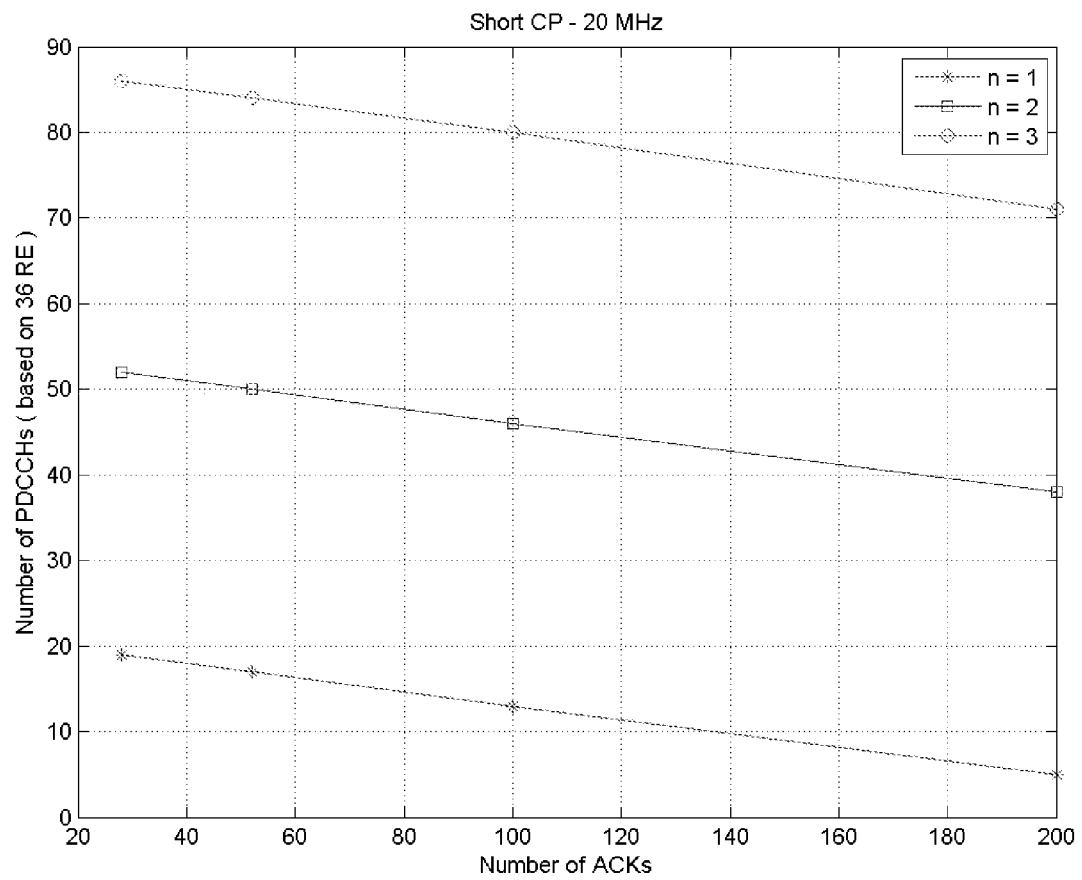

FIG. 4B is a diagram illustrating CCEs and their bit relationship. As apparent in FIG. 4B, the CCE combinations are in ascending pairs, i.e., 1, 2, 4, and 8. Thus, CCEs can be represented as the set of elements {1, 2, 4, 8}, with the lowest element having 72 coded bits and the highest element having 576 coded bits. As mentioned above, the PDCCH structure is formed by combinations of the CCEs. Thus, the PDCCH train may contain various combinations of the set elements defined above. For example, a PDCCH train may contain the following CCE elements—1, 8, 8, 2, 4, 1, 8, etc. Combinatorially speaking, for a given size of CCEs (X), in an unrestricted or non-constrained arrangement there are (X 1)+(X 2)+(X 4)+(X 8) total possible bit combinations. If the size of the CCE is 32, there will be 10,554,788 possible combination of bits in the PDDCH. It should be noted that though FIG. 4B illustrates a maximum CCE size of 8, in some embodiments, there may be more or even less CCEs, according to design implementation.

It may occur that a UE may need to blindly decode a Physical Downlink Control Channel (PDCCH) from from several possible formats and associated Control Channel Elements (CCEs). Unfortunately, this may impose a substantial burden on the UE that may exceed practical hardware limitations and thus lead to increased costs and/or reduced performance of the UE. In view of this, the following exemplary approaches are presented to reducing the number of possible combinations by exploiting at least the limited pairing nature of the CCEs.

Studies are provided with a mind to understanding how the CCEs are concatenated and how a "blind" search can be performed to reduce the effort required to perform the blind decode.

One exemplary design solution may include limiting the number of information bits per PDCCH to sets of different possible numbers. Five sets being a suitable number of the possible numbers for the examples provided herein. Of course, more or less sets may be utilized according to design preference. Using five sets, as an example, the problem can be broken down into two parts, including: (1) identifying those CCEs associated with a PDCCH (decoupling the CCE associated with PHICH and PDCCH), and (2) blind decoding of the PDCCH within its associated CCE.

For the disclosed approach to PDCCH blind decoding, a number of assumptions may be made, including: (1) a UE has decoded a particular P-BCH correctly, and (2) the decoded P-BCH contains information relevant for CCE identification.

In the absence of PDCCH-less operation of a D-BCH, the relevant PDCCH CCE identification may be needed even for UEs acquiring a cell. Therefore one cannot assume any signaling on D-BCH. However, if PDCCH-less operation of D-BCH is allowed, then relevant information can be signaled on the related D-BCH.

Generally, for E-UTRA there can be three types of CCEs to consider:
Mini-CCEs,
PHICH CCEs and
PDCCH CCEs.

Mini-CCE can consist of 4 Resource elements (REs) noting that the definition might be changed to 2 REs in view of the PHICH structure occurring in long Cyclic Prefix (CP) scenarios. Mini-CCEs may be used as "building blocks" for PCFICHs, PDCCHs and PHICHs.

PHICH CCEs can consist of 12 REs noting that a short CP may include three strips of 4 RE each and a long CP may include 6 strips of 2 REs each. Note that, among the various LTE downlink control channels, the PHICH can be used to transmit ACK/NACK for uplink transmission.

A PHICH has a hybrid CDM-FDM structure. Hybrid CDM/FDM signals allows for power control between acknowledgments for different users and provides good interference averaging. In addition, it can also provide frequency diversity for different users. Thus, the Bandwidth and power load for a PHICH doesn't have to be balanced, and to identify the CCE for a PDCCH, one may able to do so by considering only the bandwidth load.

PDCCH CCEs may have four types of REs. In this example, those four types may consist of {36, 72, 144, 288} REs, respectively.

Based on the above, let N denote the number of Physical uplink shared channels (PUSCHs) to be acknowledged in downlink. Since there may be 3-bits to signal a cyclic shift for Spatial Division Multiple Access (SDMA), the theoretical maximum value of N equals 8×number of physical resource block (PRB) pairs in uplink. ($2^3$=8).

In an effort to count how many CCEs are available for PDCCH (assignments), various resources can be discounted which are used for other control information. The other control information can be the DL ACKs (PHICH) and the PCFICH (Physical Control Format Indicator Channel). The relevance of this is to see how many net CCEs are available in the PDCCH, and based on constraints provided in that information tailor the blind decode accordingly.

Beginning with the definitions Nmax_prb_bw=the number of resource blocks for PUSCH transmission; and f_PHICH=the fractional use of PHICH resources (Physical HARQ Indicator Channel), let Nmax_bw_rx indicate the maximum number of PUSCHs to be acknowledged for a given bandwidth and number of Rx antennas (Nrx), then $$N\max\_bw\_rx = \min(Nrx, 8) * N\max\_prb\_bw; \text{ and} \quad \text{Eq (1)}$$

$$N \leq N\max\_bw\_rx \quad \text{Eq (2)}$$

Design Approach: First note that a PHICH bandwidth load can be indicated in the respective PBCH. There may be 2-bits to indicate the fractional load as a function of Nmax_bw_rx so that the fractional load f_phich={1, ½, ¼, ⅛}.

The Number of REs reserved for a PHICH (Nphich_re) is an important consideration to determine, and may be calculated, depending on CP, by:

$$Nphich\_re(\text{short } CP) = 12 * \text{ceil}(f\_phich * N\max\_bw\_rx/4) \quad \text{Eq (3)}$$

$$Nphich\_re(\text{long } CP) = 12 * \text{ceil}(f\_phich * N\max\_bw\_rx/2) \quad \text{Eq (4)}$$

Note that the number of REs reserved for a PHICH needs to be consistent with the value of n indicated in the respective PCFICH. In practice, an eNB may benefit by taking this into account.

For example, for frequency=5 MHz, Nrx=4, for short CP⇔ then Nmax_bw_rx=100, the resultant f_phich=1. Therefore, using the above equations, the resultant Nphich_re (short CP)=300. When the number of OFDM symbols (n) in the PDCCH=1 ⇔ then Nphich_re (number of REs available in 1st symbol)=200 which is<Nphich_re(short CP). Consequently, a significant reduction in the search possibilities is obtained.

Note that n is the number of OFDM symbols in the PDCCH spans, and for the present embodiments may equal 1, 2 or 3. Accordingly, the number of REs reserved for a PHICH (Nphich)_re can change based on different factors.

Tables 1-5 below further outline the results for Nphich_re for a variety of conditions for different CPs and different loads.

TABLE 1

Short CP - Load = 0.125

| Bandwidth | Number of Rx | Nmax_bw_rx | Load | Nphich_re (Number of ACKs) |
|---|---|---|---|---|
| 1.4 MHz | 2 | 14 | 0.125 | 12 (4) |
| 5 MHz | 2 | 50 | 0.125 | 24 (8) |
| 10 MHz | 2 | 100 | 0.125 | 48 (16) |
| 20 MHz | 2 | 200 | 0.125 | 84 (28) |

TABLE 2

Short CP - Load = 0.25

| Bandwidth | Number of Rx | Nmax_bw_rx | Load | Nphich_re (Number of ACKs) |
|---|---|---|---|---|
| 1.4 MHz | 2 | 14 | 0.25 | 12 (4) |
| 5 MHz | 2 | 50 | 0.25 | 48 (16) |
| 10 MHz | 2 | 100 | 0.25 | 84 (28) |
| 20 MHz | 2 | 200 | 0.25 | 156 (52) |

TABLE 3

Short CP - Load = 0.50

| Bandwidth | Number of Rx | Nmax_bw_rx | Load | Nphich_re (Number of ACKs) |
|---|---|---|---|---|
| 1.4 MHz | 2 | 14 | 0.5 | 24 (8) |
| 5 MHz | 2 | 50 | 0.5 | 84 (28) |
| 10 MHz | 2 | 100 | 0.5 | 156 (52) |
| 20 MHz | 2 | 200 | 0.5 | 300 (100) |

TABLE 4

Long CP - Load = 0.125

| Bandwidth | Number of Rx | Nmax_bw_rx | Load | Nphich_re (Number of ACKs) |
|---|---|---|---|---|
| 1.4 MHz | 2 | 14 | 0.125 | 12 (2) |
| 5 MHz | 2 | 50 | 0.125 | 48 (8) |
| 10 MHz | 2 | 100 | 0.125 | 84 (14) |
| 20 MHz | 2 | 200 | 0.125 | 156 (26) |

TABLE 5

Long CP - Load = 0.25

| Bandwidth | Number of Rx | Nmax_bw_rx | Load | Nphich_re (Number of ACKs) |
|---|---|---|---|---|
| 1.4 MHz | 2 | 14 | 0.25 | 24 (4) |
| 5 MHz | 2 | 50 | 0.25 | 84 (14) |
| 10 MHz | 2 | 100 | 0.25 | 156 (26) |
| 20 MHz | 2 | 200 | 0.25 | 300 (50) |

Next, consider PHICH CCE to RE mapping. Such can be mapped "around" an RE for a given RS even if there is only one Tx antenna. This substantially simplifies the mapping. Given the following definitions:

N_re = number of resource elements

Nrs_re: number of resource elements for RS (reference signal)

Npcfich_re: number of resource elements for PCFICH (Physical Control Format Indicator Channel)

Interleaver mapping can be fixed as a function of Nphich_re and the Number of Tx antennas. In the following example, the net number of resources available for PDCCH (assignments) transmission is calculated, while discounting the tones (REs) that are use for other tasks (within the control region). The remaining REs can then be made available for PDCCH, and for the purpose of this disclosure can be denoted as Npdcch_re, which may be calculated by:

$$Npdcch\_re = 36 * floor((Navail\_re - Npcfich\_re - Nphich\_re)/36) \quad \text{Eq (5)}$$

and the number of available REs calculated by:

$$Navail\_re = N\_re - Nrs\_re \quad \text{Eq (6)}$$

Tables 6 and 7 below are provided to demonstrate the number of Npdcch_re for short CPs and a number of different PHISH loads.

TABLE 6

Short CP - PHICH Load = 0.125

| Bandwidth | Number of Tx | n | Nphich_re (Number of ACKs) | Npdcch_re (Number of Grants) |
|---|---|---|---|---|
| 1.4 MHz | {1, 2} | 1 | 12 (4) | 0 (0) |
| 5 MHz | {1, 2} | 1 | 24 (8) | 144 (4) |
| 10 MHz | {1, 2} | 1 | 48 (16) | 324 (9) |
| 20 MHz | {1, 2} | 1 | 84 (28) | 684 (19) |

TABLE 7

Short CP - PHICH Load = 0.125

| Bandwidth | Number of Tx | n | Nphich_re (Number of ACKs) | Npdcch_re (Number of Grants) |
|---|---|---|---|---|
| 1.4 MHz | {1, 2} | 3 | 12 (4) | 180 (5) |
| 5 MHz | {1, 2} | 3 | 24 (8) | 756 (21) |
| 10 MHz | {1, 2} | 3 | 48 (16) | 1512 (42) |
| 20 MHz | {1, 2} | 3 | 84 (28) | 3096 (86) |

Continuing, FIGS. 5-8 depict graphical representations of the number of PDCCHs as a function of acknowledgments for different bandwidths, the span of the PDCCH, and assuming a short CP. Here we can see that the PDCCH size (short/long) affects the choice of CCEs. For example, a given PDCCH size (1) can translate to a CCE set {1,2}, and a given PDCCH size (2) can translate to a CCE set {4,8}. Therefore, in one exemplary embodiment, the PDCCH size operates as a metric in determining the concatenation set. With this information, the number of combinations of CCE sizes that the UE must search to blind decode can be reduced by examining the type of PDCCH (size) being transmitted.

For PDCCH blind decoding, the number of PDCCH formats may depends on the final number of information bits. Assuming embodiments that have up to 5 formats, with number of information bits ranging from 30 to 60, the potential number of PDCCHs (based on 36 REs) may be calculated as:

$$Npdcch\_max = floor(Npdcch\_re/36) \quad \text{Eq (7)}$$

In practice, it should be appreciated that the number of blind decodes can increase drastically with Npdcch_max. For example, for Npdcch_max=3, there may be {1,1,1}, {2,1}, {1,2} ⇔ 25 blind decodes, while for Npdcch_max=4, there may be {1,1,1,1}, {2,1,1}, {1,2,1}, {1,1,2}, {2,2}, {4} ⇔ 40 blind decodes, and for Npdcch_max=5 there may be {1,1,1,1,1}, {2,1,1,1}, {1,2,1,1}, {1,1,2,1}, {1,1,1,2}, {1,4}, {4,1} ⇔ 55 blind decodes.

Given such, it may be unreasonable to expect a given UE to monitor all possible PDCCHs. However, several observations can be made to reduce the number of possibilities.

For a native code rate of Tailbiting Convolutional Code (TBCC)=⅓ and where the number of information bits=30-60 and where there is no coding gain beyond 144 RE for all formats, one may restrict the number of REs to {36, 72, 144}.

Where there is no coding gain beyond 72 RE for less than 48 information bits, one may restrict the number of information bits=30-60 and REs to {36, 72}.

Noting that the code rate may be too high if 36 REs are used for more than 48 information bits, may restrict the number of information bits=48-60 and REs to {72, 144}. Therefore, using the above constraints either individually or in combination, and where applicable, a significant reduction in the number of REs or combinations can be achieved.

A further reduction in number of combinations can be achieved using a number of approaches, e.g., by assuring that the concatenation of REs are always done in the beginning, rather than at any arbitrary location. For example, for an Npdcch_max=4 will provide {1,1,1,1}, {2,1,1}, {2,2}, {4}, and the Npdcch_max=5 will result in {1,1,1,1,1}, {2,1,1,1}, {2,2,1}, {4,1}.

The above sets illustrate an example where the first "pairs" of identical elements are collapsed. For example, for the Npdcch_max=4 case, the first two is of the set {1,1,1,1} are collapsed into the first 2 of the following set {2,1,1}; and the following two is of the set {2,1,1} is collapsed into the second 2 of the following set {2,2}; and the first two 2s of the set {2,2} is collapsed into the set {4}. This approach, of course, can be also applied to the Npdcch_max=5 case, as well as for other Npdcch_max values. This arrangement can be considered a tree-based approach where the boundaries of the CCEs are continuous and "stacked."

Figure 9:
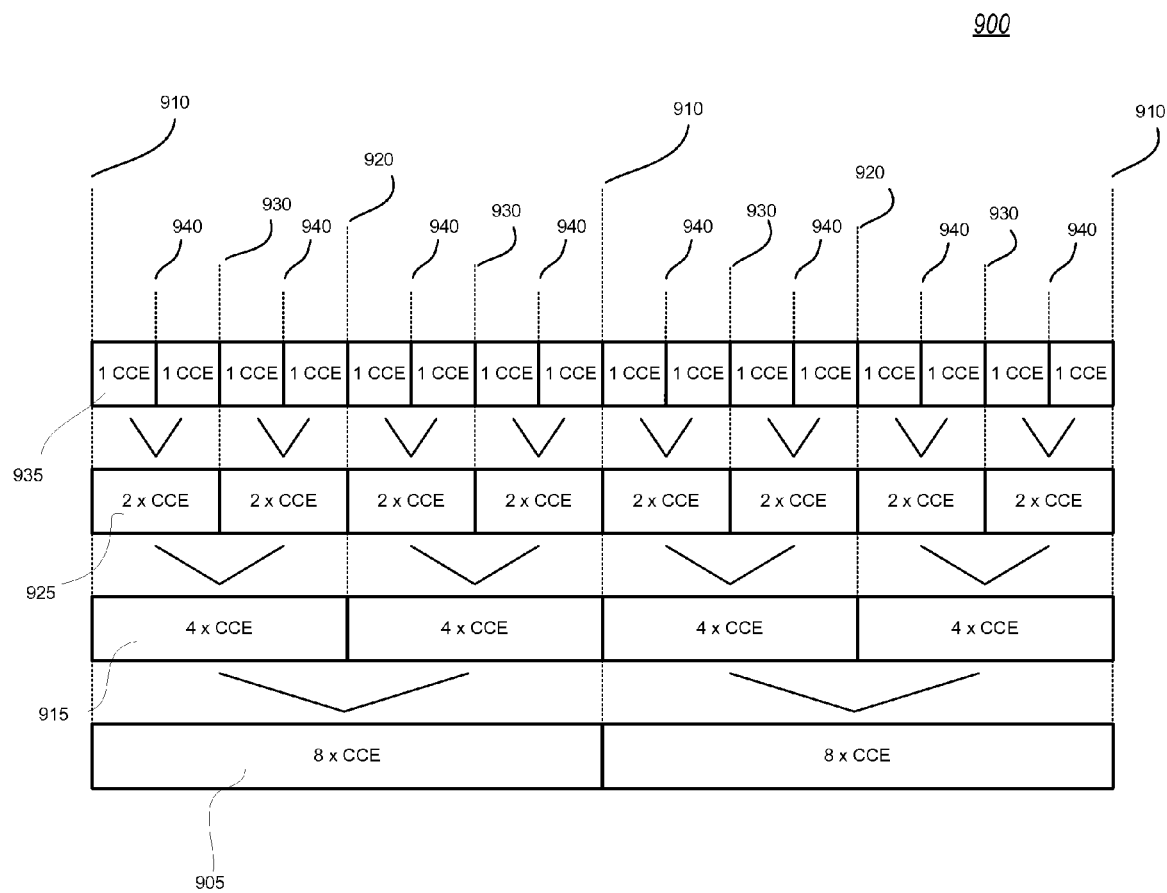
FIG. 9 provides a graphical illustration of a contiguous and tree-based concatenation.

FIG. 9 provides a graphical illustration 900 of a contiguous and tree-based concatenation as described above using 16 CCEs, as an example. In this example, the largest grouping is 8 CCEs 905, arranged to form contiguous segments. The next grouping is formed of sets of 4 CCEs 915 arranged continuous to each other, and in a "tree" above the pair of 8 CCE 905 segments where boundaries 920 for the pair of 4 CCEs 915 alternately match up to the boundaries 910 of the 8 CCE 905 segments. Similarly, the 2 CCEs 925 segments are contiguous to each other and boundaries 930 alternately match up to the boundaries 920 for the 4 CCE 915 segments. The boundaries 940 for the 1 CCE 935 segments are similarly "tree'd" to the larger lower CCE segment.

By having the CCEs contiguous and tree'd, the search algorithm can be simplified. For example, if a maximum of 4 CCEs 915 are understood to be used in the PDCCH, then using the restriction that the concatenation is contiguous and tree-based, the search algorithm can be simplified to coincide with the boundaries 920 (and 910—as it also falls on the same boundary) of the 4 CCEs 915. If a maximum of 2 CCEs 925 are understood to be used in the PDCCH, then the search can be simplified to the boundaries 930 of the 2 CCEs 925. Obviously, if the CCE size is known or estimated, it eliminates the need to search or decode on the non-CCE size boundaries.

Also, it should be noted that with the above arrangement, the boundary for a given CCE coincides with a boundary of all the smaller CCE segments. This provides a significant advantage. For example, boundary 910 for the 8 CCE 905 matches up with a boundary for each of the 4 CCE 915, 2 CCE 925, and 1 CCE 935. Similarly, the same can be said for the 4 CCE 915 and all smaller CCEs above it. Therefore, each larger sized CCEs' boundary also forms at least one boundary with all the smaller sized CCE's. Thus, by starting on a gross, or large boundary, any smaller CCE sizes also on that boundary can also be captured in the search.

As is apparent with contiguous/tree-based grouping, various methods for searching or sorting may applied that are known in the art to accelerate or reduce the number of possible searches, including having the order in a root form, rather than a tree form.

In another embodiment of this disclosure, let the candidate number of information bits be {32, 40, 48, 56, 64} where {32, 40, 48} bits map to {36, 72} RE and {56, 64} bits map to {72, 144} RE.

Assuming an Npdcch_max=4 ⇔ the ordering of the REs become {1,1,1,1}, {2,1,1}, {2,2}, {4}, and the number of blind decodes=(4×3)+(2×5)+(1×2)=24 blind decodes, which amounts to a 40% reduction in number of blind decodes.

Assuming an Npdcch_max=5 ⇔ {1,1,1,1,1}, {2,1,1,1}, {2,2,1}, {4,1}, and the number of blind decodes=(5×3)+(2×5)+(1×2)=27 blind decodes, which amounts to a 51% reduction in number of blind decodes.

Assuming an Npdcch_max=6 ⇔ {1,1,1,1,1,1}, {2,1,1,1,1}, {2,2,1,1}, {2,2,2}, {4,1,1}, {4,2}, then the number of blind decodes=(6×3)+(3×5)+(1×2)=27 blind decodes. Note that this amounts to no change from the case where Npdcch_max=5.

Continuing, assuming an Npdcch_max=8, the number of blind decodes=(8×3)+(4×5)+(2×2)=48 blind decodes.

A summary of one possible implementation is detailed below.

STEP 1: Restrain the candidate number of information bits to {32, 40, 48, 56, 64} where by {32, 40, 48} bits map to {36, 72} RE, and {56, 64} bits map to {72, 144} RE.

STEP 2: Restrain RE concatenation such that it is always done in the beginning, rather than at any arbitrary location, e.g., {a, b, c, . . . } such that a≥b≥c≥ . . .

STEP 3: Restrain the number of PDCCHs monitored by a given UE to 8 or less.

For further optimization, the usage of 36 REs may be restricted to the minimum payload only, i.e., {32} bits mapping to {36, 72} RE, {40, 48} bits mapping to {72} RE, and {56, 64} bits mapping to {72, 144} RE. For example, assuming that Npdcch_max=8, the resulting number of blind decodes=(8×1)+(4×5)+(2×2)=32 blind decodes.

Figure 10:
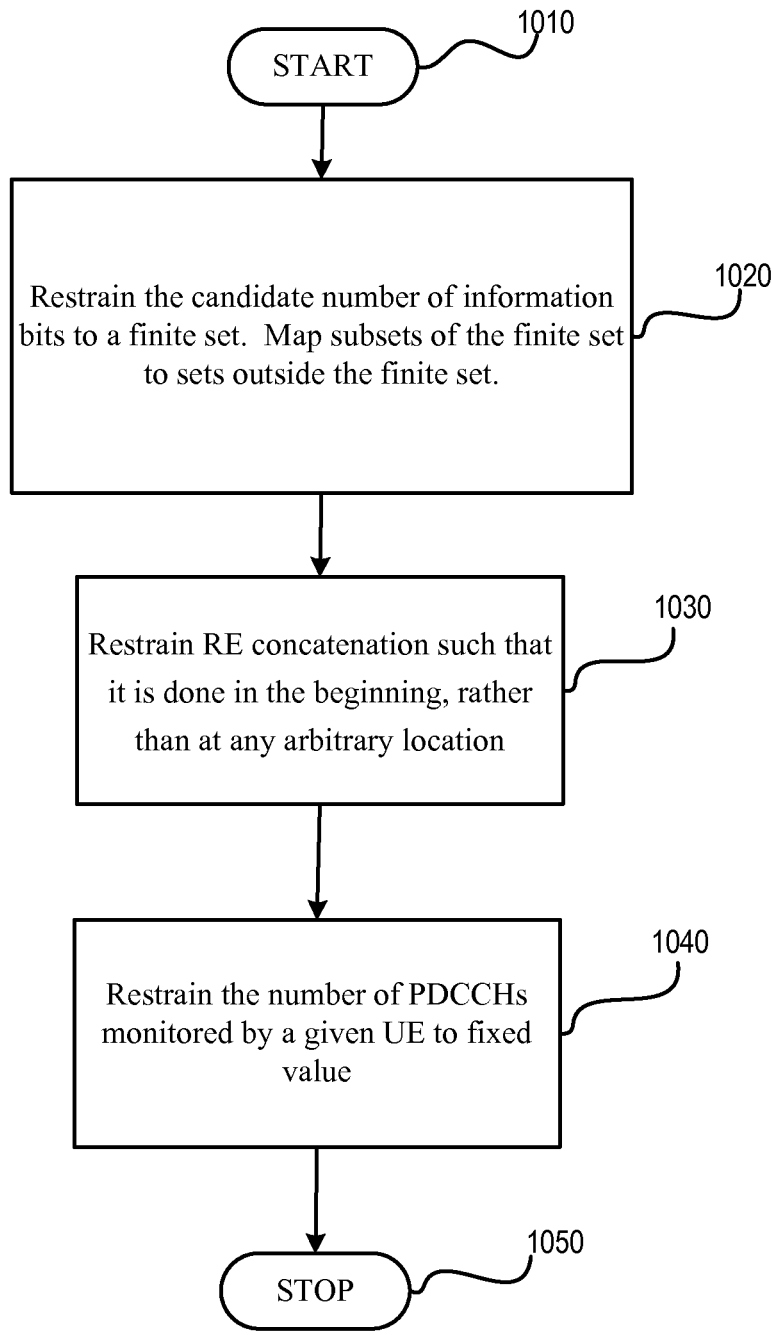
FIG. 10 contains a flowchart illustrating an exemplary process.

FIG. 10 contains a flowchart 1000 illustrating an exemplary process based on the above descriptions. The exemplary process, after initialization 1010, constrains the candidate numbers to a finite set as shown in step 1020. The finite set, for explanatory purposes, may be comprised of {32, 40, 48, 56, 64}, for example. Of the finite set, in step 1020, various combinations of the elements (i.e., subsets) will map to another set of numbers that may not be a member of the finite set. For example, the subset {32, 40, 48} may be mapped to the "outside" set {36, 72} and the remaining subset {56, 64} may be mapped to the "outside" set {72, 144}. After step 1020, the exemplary process proceeds to step 1030 where it restrains RE concatenation to a preliminary/beginning process, rather than at an arbitrary location. By this method, an ordering can be imposed on the values.

Next, the exemplary process proceeds to step 1040 where the number of PDCCHs monitored by a given UE is restrained, for example, to 8 or less. The exemplary process then terminates 1050.

The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Moreover, various aspects or features described herein can be implemented as a method, apparatus, or article of manufacture using standard programming and/or engineering techniques. The term "article of manufacture" as used herein is intended to encompass a computer program accessible from any computer-readable product, device, carrier, or media. For example, computer-readable product can include but are not limited to magnetic storage devices (e.g., hard disk, floppy disk, magnetic strips, etc.), optical disks (e.g., compact disk (CD), digital versatile disk (DVD), etc.), smart cards, and memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to reduce the processing overhead for physical downlink control channel (PDCCH) blind decoding, comprising:
receiving a PDCCH signal;
estimating a maximum number of information bits used in the PDCCH signal;
restraining a candidate number of information bits to a first set of information bits;
mapping a first subset of the first set to a second set of resource elements (REs) that is not in the first set;
mapping a second subset of the first set to a third set of REs that is not in the first set;
restraining concatenation of elements of the sets to form largest to smallest order; and
performing a blind decoding initially based on elements in the first set, and proceeding to elements of the second set and third set.

2. The method of claim 1, wherein the first set of information bits is comprised of {32, 40, 48, 56, 64}, wherein the first subset of {32, 40, 48} REs map to the second set of {36, 72} REs, and the second subset of {56, 64} map to the third set of {72, 144} REs.

3. A computer-readable product comprising a non-transitory computer-readable medium containing code for:
receiving a physical downlink control channel (PDCCH signal;
estimating a maximum number of information bits used in the PDCCH signal;
restraining a candidate number of information bits to a first set of information bits;
mapping a first subset of the first set to a second set of resource elements (REs) that is not in the first set;
mapping a second subset of the first set to a third set of REs that is not in the first set;
restraining concatenation of elements of the sets to form largest to smallest order; and
performing a blind decoding initially based on elements in the first set, and proceeding to elements of the second set and third set.

4. The computer-readable product of claim 3, wherein the first set of information bits is comprised of {32, 40, 48, 56, 64}, wherein the first subset of {32, 40, 48} map to the second set of {36, 72} REs, and the second subset of {56, 64} map to the third set of {72, 144} REs.

5. An apparatus configured to reduce the processing overhead for physical downlink control channel (PDCCH blind decoding, comprising:
means for receiving a PDCCH signal;
means for estimating a maximum number of information bits used in the PDCCH signal;
means for restraining a candidate number of information bits to a first set of information bits;
means for mapping a first subset of the first set to a second set of resource elements (REs) set that is not in the first set;
means for mapping a second subset of the first set to a third set of REs that is not in the first set;
means for restraining concatenation of elements of the sets to form largest to the smallest order; and
means for performing a blind decoding initially based on elements in the first set, and proceeding to elements of the second set and third set.

6. The apparatus of claim 5, wherein the first set of information bits is comprised of {32, 40, 48, 56, 64}, wherein the first subset of {32, 40, 48} map to the second set of {36, 72} REs, and the second subset of {56, 64} map to the third set of {72, 144} REs.

* * * * *